United States Patent
Lee

(10) Patent No.: US 8,838,076 B2
(45) Date of Patent: *Sep. 16, 2014

(54) METHOD AND DEVICE FOR STORING AND DISPLAYING MUSIC FILE LIST IN MOBILE COMMUNICATION TERMINAL USING HOT KEYS

(75) Inventor: Yun Seong Lee, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 799 days.

This patent is subject to a terminal disclaimer.

(21) Appl. No.: 11/806,142

(22) Filed: May 30, 2007

(65) Prior Publication Data

US 2008/0070622 A1    Mar. 20, 2008

(30) Foreign Application Priority Data

Sep. 15, 2006 (KR) ........................ 10-2006-0089611

(51) Int. Cl.
*H04M 3/42* (2006.01)
*H04M 1/725* (2006.01)

(52) U.S. Cl.
CPC ...... *H04M 1/72522* (2013.01); *H04M 1/72558* (2013.01)
USPC ...................... 455/414.1; 455/414.2; 455/566

(58) Field of Classification Search
CPC .................................................... H04W 68/00
See application file for complete search history.

(56) References Cited

U.S. PATENT DOCUMENTS

| | | | |
|---|---|---|---|
| 5,819,160 A * | 10/1998 | Foladare et al. | 455/45 |
| 7,668,829 B2 * | 2/2010 | Chu et al. | 455/412.1 |
| 8,055,654 B2 * | 11/2011 | Chu | 707/722 |
| 2003/0119562 A1 * | 6/2003 | Kokubo | 455/566 |
| 2003/0223554 A1 * | 12/2003 | Zhang | 379/93.12 |
| 2005/0158018 A1 * | 7/2005 | Sawada | 386/46 |
| 2006/0014523 A1 * | 1/2006 | Reilly | 455/412.1 |
| 2007/0085759 A1 * | 4/2007 | Lee et al. | 345/1.1 |
| 2008/0066610 A1 * | 3/2008 | Chu et al. | 84/609 |

FOREIGN PATENT DOCUMENTS

KR    1020060114143    11/2006

* cited by examiner

*Primary Examiner* — Charles Shedrick
(74) *Attorney, Agent, or Firm* — Roylance, Abrams, Berdo & Goodman L.L.P.

(57) ABSTRACT

A device and method of storing and displaying a music file list in a mobile communication terminal using a hot key are provided. More particularly, a method for storing a music file list by pressing the hot key for an extended period and displaying the music file list by pressing the key for an abbreviated period is provided. A specific music file list is selected from at least one music file list displayed in a music file playback mode. If a number key input occurs after selecting the specific music file list, a determination is made as to whether the number key input is a long press input or short press input. If the number key input is a long press input, the music file list is stored into the number of the number key. If the number key input is a short press input, the music file list stored into the number is displayed. The method facilitates the simple storage and display of a music file list through a hot key input to ultimately increase user convenience.

8 Claims, 5 Drawing Sheets

METHOD AND DEVICE FOR STORING AND DISPLAYING MUSIC FILE LIST IN MOBILE COMMUNICATION TERMINAL USING HOT KEYS

CROSS-REFERENCE TO RELATED PATENT APPLICATION

This application claims the benefit under 35 U.S.C. §119(a) of a Korean Patent Application filed in the Korean Intellectual Property Office on Sep. 15, 2006 and assigned Serial No. 2006-89611, the entire disclosure of which is hereby incorporated by reference.

BACKGROUND OF THE INVENTION

1. Field of the Invention

The present invention relates to a method and device for storing and displaying a music file list in a mobile communication terminal using hot keys. More particularly, the present invention relates to a method for storing a music file list by pressing a hot key for an extended period of time and displaying a music file list by pressing a hot key for an abbreviated period of time.

2. Description of the Related Art

The current advancement of communication technology has allowed mobile communication terminals to provide a plurality of additional functions such as game, alarm, and MP3 playback functions using various images and sounds, as well as communication functions such as the ability to make phone calls and the use of short message service (SMS). Thus, the mobile communication terminal facilitates a user's ability to enjoy various benefits and call functions.

In general, an MP3 playback function of a mobile communication terminal requires multiple steps to set a music file list. For example, a process of setting a music file list may include selecting a music file stored in a mobile communication terminal, selecting an appropriate menu or option to display music file lists stored in the mobile communication terminal, selecting a desired music file list from the displayed music file lists, and storing the music file in the music file list. Setting a music file list in this manner causes complication or inconveniences the users.

Further, a method for displaying a desired music file list involves selecting an MP3 playback function, selecting a folder in which a desired music file list is stored among subsequent menus for the function, and selecting and displaying the desired music file list. Thus, the stored music file list can be displayed by going through multiple steps, thus causing user inconvenience.

Accordingly, there is a need for an improved system and method for storing music file lists in a mobile communication terminal.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a system and method for storing a music file list in a mobile communication terminal that allows simple setting of a music file list.

Another object of an exemplary embodiment of the present invention is to provide a method for displaying a music file list in a mobile communication terminal in a simple manner.

According to an exemplary embodiment of the present invention, a method of storing and displaying a music file list in a mobile communication terminal and a mobile communication terminal are provided where a specific music file list is selectable from at least one music file list displayed in a music file playback mode, if a number key input occurs after selecting the specific music file list, whether the number key input is achieved by pressing the key for an extended or an abbreviated period of time is determined, if the number key input is achieved by pressing the key for an extended period of time, the music file list is stored into the number of the number key, and if the number key input is achieved by pressing the key for an abbreviated period of time, the music file list stored into the number is displayed.

According to another exemplary embodiment of the present invention, a method of storing a music file list in a mobile communication terminal is provided. The method comprises selecting one music file list from at least one music file list displayed in a music file playback mode and pressing a specific number key for an extended period of time, and storing the music file list into the number of the specific number key input which is pressed for an extended period of time.

According to still another exemplary embodiment of the present invention, there is provided a method of displaying a music file list in a mobile communication terminal, including quickly pressing a specific number key in a music file playback mode and displaying the music file list stored into the specific number input with the short press.

BRIEF DESCRIPTION OF THE DRAWINGS

The above and other exemplary objects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The term "music file list" is characteristic of a list of music files obtained by classifying music files stored in a mobile communication terminal according to user selection. The term "hot key" refers to a key or sequence of keys that allow a user to perform a function with a single press instead of having to maneuver through menus. For example, a hot key may be provided to store and display a music file list. A "number key long press input" refers to an input performed by pressing a number key for an extended period of time, for example a period of time that is longer than or equal to a preset time duration. A "number key short press input" is an input performed by pressing a number key for an abbreviated period of time, for example a period of time shorter than a preset time duration.

Figure 1:
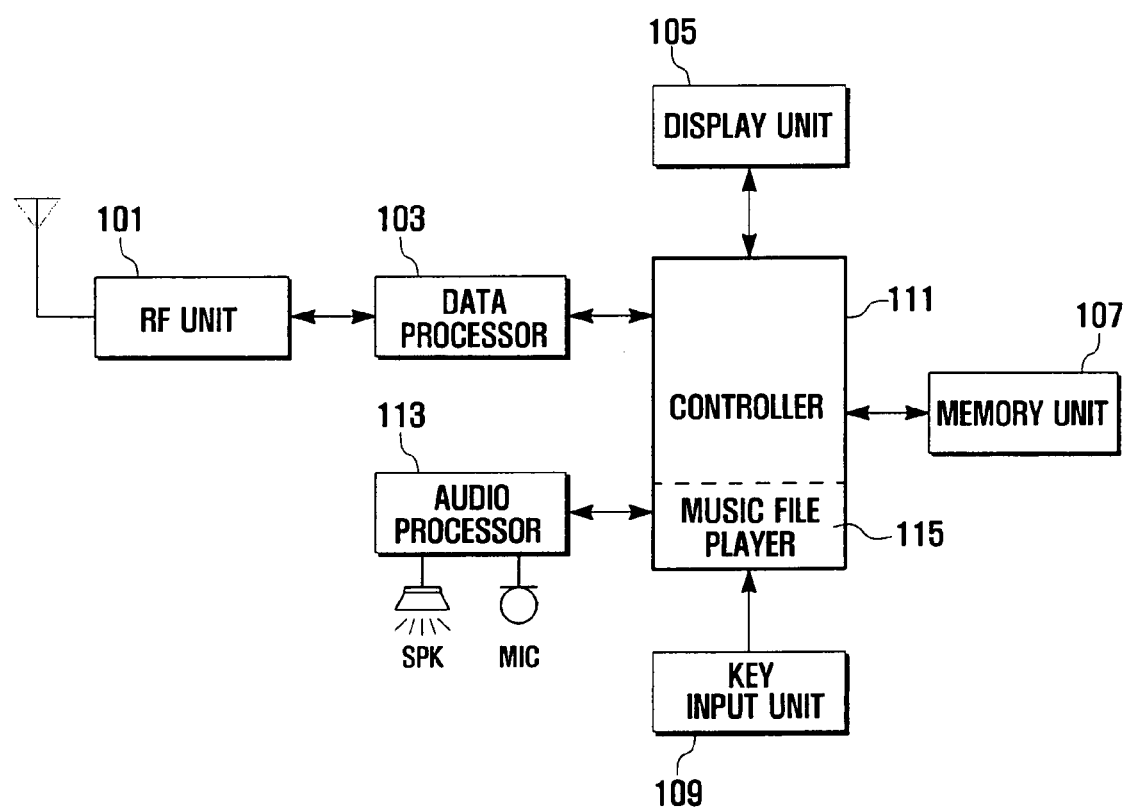
FIG. 1 is a block diagram of a configuration of a mobile communication terminal for storing and displaying a music file list according to an exemplary embodiment of the present invention.

FIG. 1 is a block diagram of a configuration of a mobile communication terminal for storing and displaying a music file list according to an exemplary embodiment of the present invention.

Referring to FIG. 1, the mobile communication terminal comprises a typical configuration including an RF unit 101, a data processor 103, a display unit 105, a memory unit 107, a key input unit 109, a controller 111, an audio processor 113, and a music file player 115 such as an MP3 player.

The RF unit 101 performs wireless communications of the mobile communication terminal. The RF unit 101 includes an RF transmitter and an RF receiver. The RF transmitter up-converts the frequency of a signal that is transmitted and amplifies the signal. The RF receiver low-noise amplifies a received signal and down-converts its frequency.

The data processor 103 includes a transmitter that encodes and modulates the signal that is transmitted and a receiver that demodulates and decodes the signal that is received. That is, the data processor 103 includes a modulator/demodulator (modem) and a coder/decoder (codec). The codec includes a data codec for processing incoming data such as packet data and an audio codec for processing audio signals such as voice signals.

The display unit 105 displays data output from the controller 111. In an exemplary embodiment of the present invention, the display unit 105 displays options and user input for a music file playback function. The display unit 105 also displays a music file list hot key function and stored music file lists.

The memory unit 107 includes a program memory for performing mobile communications and a data memory. The program memory stores programs for controlling the general operations of the mobile communication terminal and a program for storing a music file list into a specific number input by long pressing a hot key. The data memory temporarily stores data generated while executing programs according to an exemplary embodiment of the present invention.

The key input unit 109 receives a user's manipulation signal to control the operation of the mobile communication terminal. The key input unit 109 inputs a specific number with a long press or short press to perform a music file list hot key function according to an exemplary embodiment of the present invention.

The controller 111 performs the overall control operation of the mobile communication terminal. The controller 110 may include an internal or external MP3 player 115. In the exemplary embodiment of the present invention, the controller 110 includes the internal music file player 115 such as an MP3 player. The controller 111 selects a music file list stored in the music file player 115 according to a user's input, performs a hot key function corresponding to a specific number for the music file list, and controls the memory unit 107 to store the selected music file list into the specific number.

The audio processor 113 reproduces an MP3 file or audio signal output from the controller 111 through a speaker SPK, and outputs an audio signal generated through a microphone MIC to the audio codec of the data processor 103 for transmission.

Figure 2:
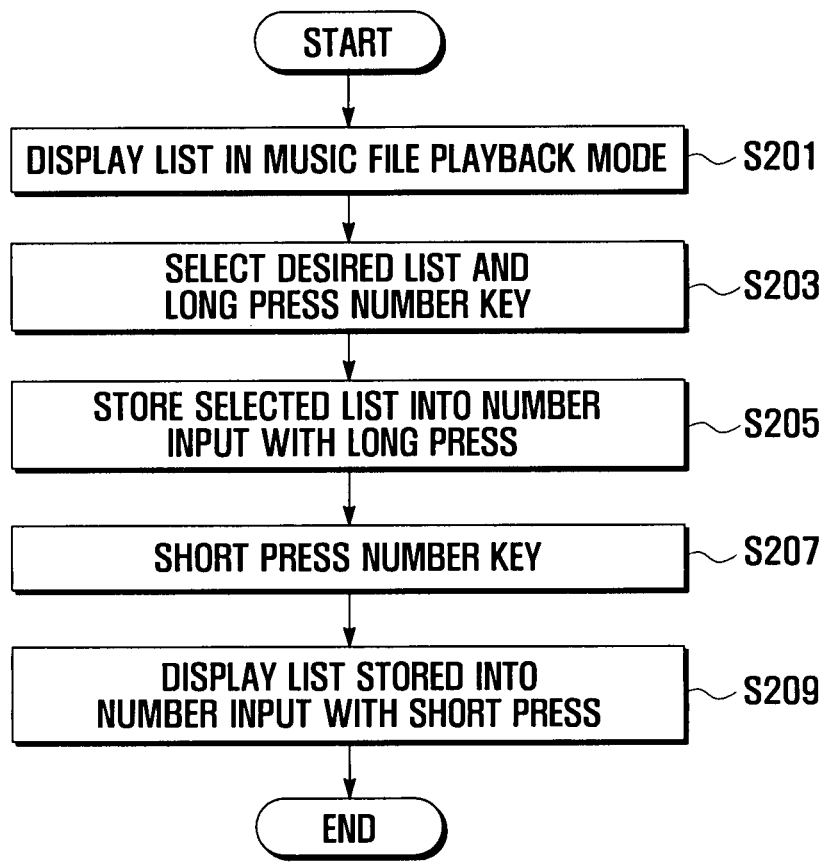
FIG. 2 is a flowchart illustrating a method of storing and displaying a music file list in a mobile communication terminal according to an exemplary embodiment of the present invention.
Figure 3:
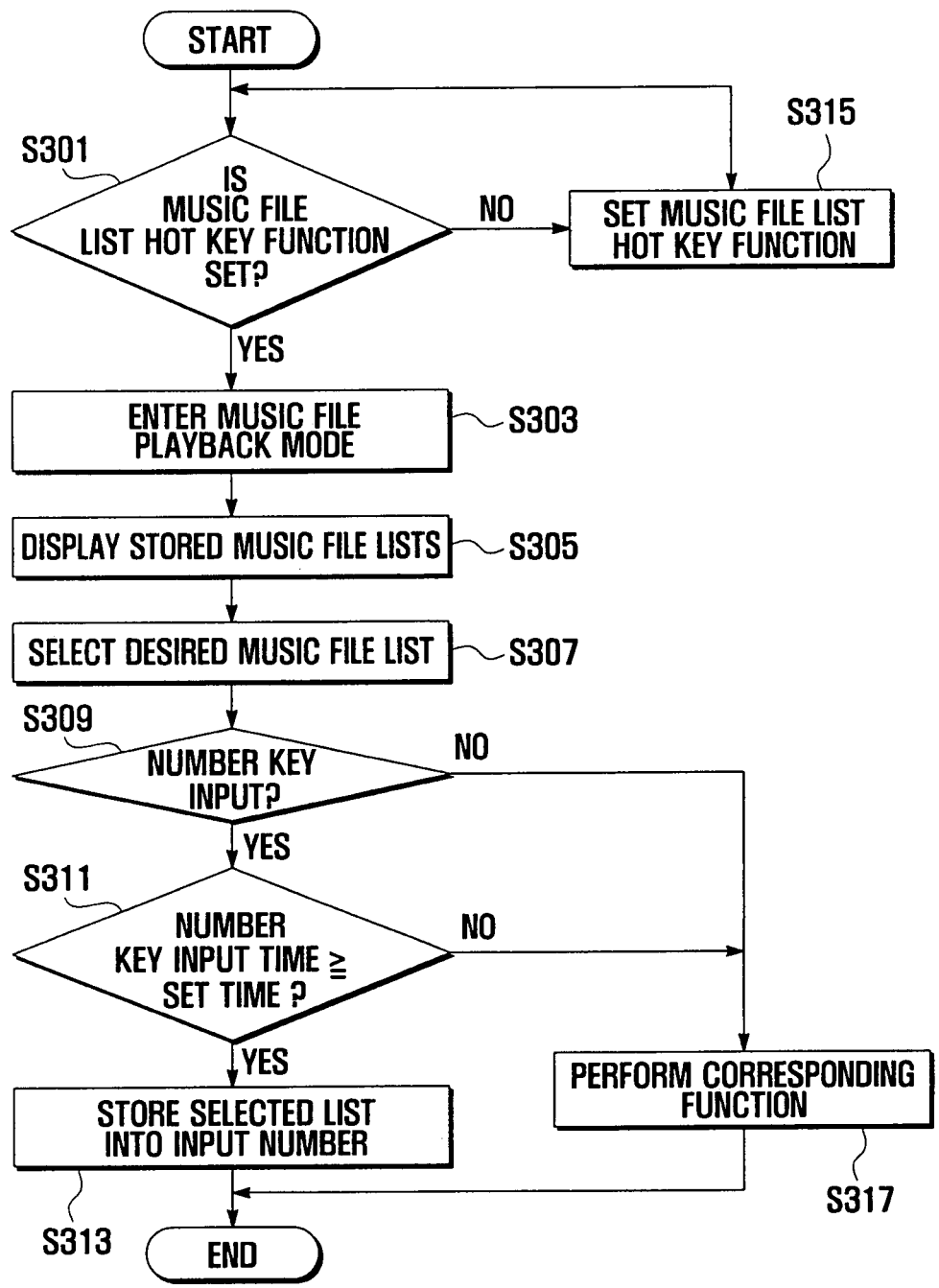
FIG. 3 is a flowchart illustrating an operation of storing a music file list in a mobile communication terminal according to the method of FIG. 2.
Figure 4:
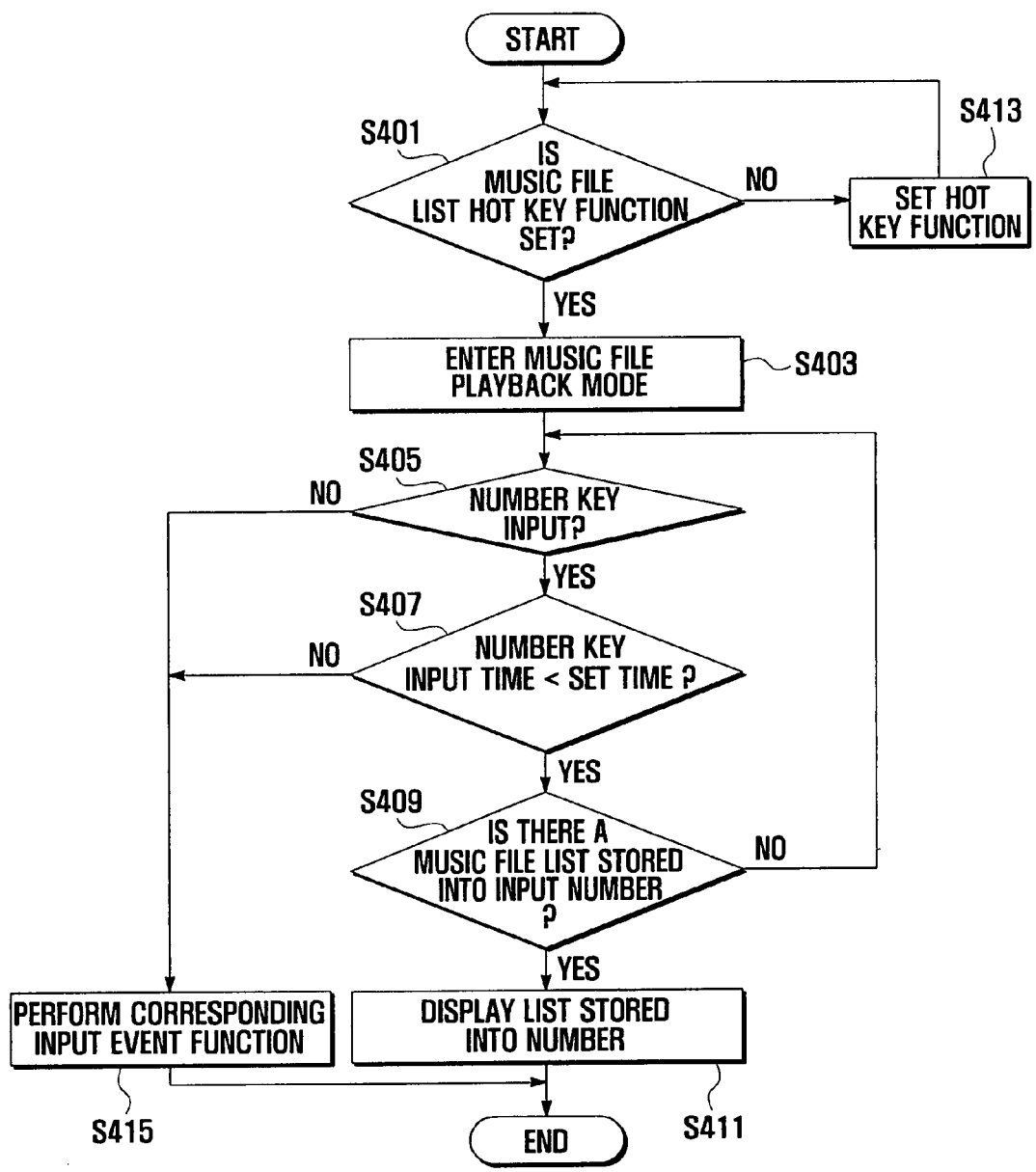
FIG. 4 is a flowchart illustrating an operation of displaying a music file list in a mobile communication terminal according to the method of FIG. 2.
Figure 5A:
FIG. 5A illustrates a state in which a specific music file list is selected for storage according to the method of FIG. 2.
Figure 5B:
FIG. 5B illustrates a state in which a specific music file list is stored in a mobile communication terminal according to the method of FIG. 2.

FIG. 2 is a flowchart illustrating a method of storing and displaying a music file list in a mobile communication terminal according to an exemplary embodiment of the present invention. FIG. 3 is a flowchart illustrating an operation of storing a music file list in a mobile communication terminal according to the method of FIG. 2. FIG. 4 is a flowchart illustrating an operation of displaying a music file list in a mobile communication terminal according to the method of FIG. 2. FIG. 5A illustrates a state in which a specific music file list is selected for storage according to the method of FIG. 2. FIG. 5B illustrates a state in which a specific music file list is stored in a mobile communication terminal according to the method of FIG. 2. A method for storing and displaying a music file list in a mobile communication terminal using a hot key according to exemplary embodiments of the present invention is described in detail with reference to FIGS. 1-4.

Referring to FIG. 2, when the mobile communication terminal enters a music file playback mode, the controller 111 controls the display unit 105 to display stored music file lists (S201). Step S201 is illustrated in detail in FIG. 3.

Referring to FIG. 3, the controller 111 determines whether a music file list hot key function is set (S301). If a hot key function is not set, the controller 111 sets the music file list hot key function (S315). When setting the music file list hot key function, the controller 111 also sets a time duration for determining whether a key is input by long pressing or by short pressing a hot key.

If a music file list hot key function is set at step S301 through manipulation of the key input unit 109, the controller 111 determines that the mobile communication terminal is in a music file playback mode (S303), and controls the display unit 105 to display stored music file lists (S305).

Referring to FIG. 2, a desired music file list is selected by the user through the key input unit 109 and a specific number key is long pressed (S203). According to an exemplary embodiment of the present embodiment, as illustrated in FIG. 5A, the key input unit 109 selects the second music file list from music file lists displayed on the display unit 105. Step S203 is illustrated in detail in FIG. 3 and discussed below.

Referring to FIG. 3, a desired music file list is selected (S307) from displayed music file lists and output to the controller 111. In the example of FIG. 5A, the second music file list is selected by the key input unit 109.

The controller 111 then determines whether an input event is a specific number key input (S309). If an input event is not a specific number key input, the controller 111 performs a function corresponding to the input event (S317).

If an input event is a specific number key input, the controller 111 determines whether the number key is pressed for a period of time longer than or equal to the time duration set in step S301 (S311). According to an exemplary implementation, the controller 111 verifies whether the number key input is a long press input. If the number key input is not a long press input, the controller performs a function corresponding to the input event (S317).

Referring to FIG. 2, if the number key is pressed for a period of time longer than or equal to the preset time duration, the controller 111 stores the selected music file list into the number input with the long press (S205). According to an exemplary implementation, if number key 1 is long pressed after selecting the second music file list "Korean pop-song" (illustrated in FIG. 5A), the second music file list "Korean pop-song" changes positions and becomes the first music file list "CCM" so that the hot keys of the original first music file list "CCM" and the original second "Korean pop-song" are interchanged with each other (illustrated in FIG. 5B). Step S205 in FIG. 2 corresponds to step S313 in FIG. 3.

According to an exemplary implementation, the controller 111 determines a short press input of a predetermined number key (S207). Step S207 is illustrated in detail in FIG. 4.

Referring to FIG. 4, the controller 111 determines whether a music file list hot key function is set (S401). If a hot key function has not been set, the controller 111 sets the music file list hot key function (S413). As described with reference to step S315, the controller 111 also sets time duration, to determining whether a key is input by long pressing or by short pressing a hot key.

If a music file list hot key function is set at step S401 through manipulation of the key input unit 109, the controller 111 determines that the mobile communication terminal is in a music file playback mode (S403).

The controller 111 then determines whether an input event is a specific number key input (S405). If an input event is not a specific number key input, the controller 111 performs a function corresponding to the input event (S415).

If an input event is a specific number key input, the controller 111 determines whether the number key is pressed for shorter period of time than the time duration set in step S401 (S407). According to an exemplary implementation, the controller 111 determines whether the number key input is a short press input. If the number key input is not a short press input, the controller performs a function corresponding to the input event (S415).

According to an exemplary implementation, the controller 111 controls the display unit 105 to display a music file list stored into the number input with the short press (S209). Step S209 is illustrated in FIG. 4 as follows.

Referring to FIG. 4, the controller 111 determines whether a music file list is stored into the number input with a short press (S409). If no music file list is stored into the number input with a short press, the process returns to step S405 and the controller 111 determines whether another number key is input.

If a music file list is stored into the number input with a short press, the controller 111 controls the display unit 105 to display the stored music file list (S411).

As described above, a method for storing and displaying a music file list using a hot key according to an exemplary embodiment of the present invention facilitates simple storage and display of a music file list, compared to the complicated process of using a conventional method for storing and displaying a music file list.

Thus, an exemplary embodiment of the present invention facilitates storage of a music file list by long pressing a hot key without performing a process of setting a music file list, and displays a music file list by short pressing a hot key to ultimately increase user convenience.

While the present invention has been particularly shown and described with reference to embodiments thereof, it will be understood by those of ordinary skill in the art that various changes and modifications in form and details may be made without departing from the spirit and scope of the present invention as defined by the following claims and their equivalents.

What is claimed is:

1. A method of storing and displaying a music file list in a mobile communication terminal, the method comprising:
    selecting a music file list from a plurality of music file lists displayed in a music file playback mode;
    determining, if a hot key input occurs after selecting the music file list, whether the hot key input is a long press input or a short press input;
    storing the selected music file list in a memory according to the hot key if the hot key input comprises a long press input; and
    displaying the music file list stored in the memory according to the hot key if the hot key input comprises a short press input;
    wherein the music file list comprises a list of one or more music files that are commonly classified; and
    wherein the music file list is characteristic of a list of music files obtained by classifying music files that are stored in a mobile communication terminal according to a user selection.

2. A method of storing a music file list in a mobile communication terminal, the method comprising:
    selecting a music file list from a plurality of music file lists displayed in a music file playback mode;
    performing a long press input of a specific hot key;
    storing the selected music file list in a memory according to the specific hot key input with the long press input; and
    displaying the music file list stored in the memory according to the hot key if the hot key input comprises a short press input;
    wherein the music file list comprises a list of one or more music files that are commonly classified; and
    wherein the music file list is characteristic of a list of music files obtained by classifying music files that are stored in a mobile communication terminal according to a user selection.

3. The method of claim 2, wherein the long press input of the specific hot key comprises verifying whether a music file list hot key function is set.

4. A method of displaying a music file list in a mobile communication terminal, the method comprising:
    providing for at least one of a short press input and a long press input;
    performing the short press input of a specific hot key in a music file playback mode; and
    displaying the music file list stored in a memory according to the specific hot key input with the short press input;
    wherein the music file list comprises a list of one or more music files that are commonly classified; and
    wherein the music file list is characteristic of a list of music files obtained by classifying music files that are stored in a mobile communication terminal according to a user selection.

5. The method of claim 4, wherein the short press input of the specific hot key comprises verifying whether a music file list hot key function is set.

6. A mobile communication terminal comprising:
    a memory unit for storing a music file list;
    an input unit for receiving one of a short press input and a long press input of at least one key;
    a display unit for displaying the music file list; and
    a controller for
        selecting a music file list from at least one music file list displayed in a music file playback mode,
        determining, if a hot key input occurs after selecting the music file list, whether the hot key input is at least one of a long press input and a short press input, storing the selected music file list in the memory unit according to the hot key if the hot key input comprises a long press input, and displaying the music file list stored in the memory unit according to the hot key if the hot key input comprises a short press input;

wherein the music file list comprises a list of one or more music files that are commonly classified; and wherein the music file list is characteristic of a list of music files obtained by classifying music files that are stored in a mobile communication terminal according to a user selection.

7. The mobile communication terminal of claim 6, wherein the memory unit comprises a program memory for performing mobile communications and a data memory.

8. The mobile communication terminal of claim 7, wherein the program memory stores programs for controlling operations of a mobile communication terminal and a program for storing a music file list into the memory unit according to a specific number input by pressing a hot key for an extended period of time and the data memory temporarily stores data generated while executing programs.

* * * * *